US007702072B2

(12) United States Patent
Rieutord

(10) Patent No.: US 7,702,072 B2
(45) Date of Patent: Apr. 20, 2010

(54) X-RAY OR NEUTRON MONOCHROMATOR

(75) Inventor: Francois Rieutord, St. Egreve (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 11/814,330

(22) PCT Filed: Jan. 20, 2006

(86) PCT No.: PCT/FR2006/000133

§ 371 (c)(1),
(2), (4) Date: Jan. 25, 2008

(87) PCT Pub. No.: WO2006/077329

PCT Pub. Date: Jul. 27, 2006

(65) Prior Publication Data

US 2008/0279332 A1 Nov. 13, 2008

(30) Foreign Application Priority Data

Jan. 21, 2005 (FR) .................................. 05 00657

(51) Int. Cl.
*G21K 1/06* (2006.01)
*G01J 3/12* (2006.01)

(52) U.S. Cl. ........................................ 378/84; 356/331

(58) Field of Classification Search .................. 378/84, 378/85, 145, 156, 159; 356/331–334; 250/503.1
See application file for complete search history.

(56) References Cited

U.S. PATENT DOCUMENTS 2,853,617 A 9/1958 Berreman
3,397,312 A 8/1968 Okano (Continued)

FOREIGN PATENT DOCUMENTS

GB 1 289 399 12/1970

(Continued)

OTHER PUBLICATIONS

PCT Request in French.

(Continued)

*Primary Examiner*—Irakli Kiknadze
*Assistant Examiner*—Anastasia Midkiff
(74) *Attorney, Agent, or Firm*—Brinks Hofer Gilson & Lione

(57) ABSTRACT

The invention relates to a monochromator device for selecting at least one wavelength band from incident radiation in a given wavelength range. The monochromator device may include at least one optical layer of a monocrystalline material having a crystallographic line that is adapted to the at least one wavelength band to be selected; and a mechanical substrate. The at least one optical layer and the mechanical substrate are assembled by molecular bonding.

20 Claims, 2 Drawing Sheets

U.S. PATENT DOCUMENTS

| | | | | | |
|---|---|---|---|---|---|
| 4,261,771 | A * | 4/1981 | Dingle et al. | ............... | 117/105 |
| 4,737,973 | A * | 4/1988 | Ogawa et al. | ................. | 378/84 |
| 5,008,908 | A * | 4/1991 | Jach et al. | ..................... | 378/70 |
| 5,923,720 | A * | 7/1999 | Barton et al. | ................. | 378/84 |
| 6,307,917 | B1 * | 10/2001 | Shimizu et al. | ............. | 378/145 |
| 6,829,327 | B1 * | 12/2004 | Chen | ........................... | 378/44 |
| 2002/0021782 | A1 * | 2/2002 | McDonald | ................... | 378/84 |
| 2004/0151278 | A1 * | 8/2004 | Yokhin et al. | ................. | 378/84 |

FOREIGN PATENT DOCUMENTS

| | | |
|---|---|---|
| WO | WO 03/005443 A2 | 1/2003 |

OTHER PUBLICATIONS

PCT International Search Report.

PCT/IB/306 Form in French.

PCT Written Opinion in French.

Chandrasekaran, et al., "GaAs film on Si substrate transplanted from GaAs/Ge structure by direct bonding", Applied Physics Letters, American Institute of Physics, vol. 82, No. 22, Jun. 2, 2003.

Freund, et al., "Performances of Various Types of Benders for Sagittally Focusing Crystals on ESRF Synchrotron Beamlines", SPIE vol. 3448, pp. 144-155, Jul. 1998, XP-002346529.

Kopperschmidt, et al., "Materials Integration Of Gallium Arsenide and Silicon by Wafer Bonding", Applied Physics Letters, American Institute of Physics, vol. 72, No. 24, Jun. 15, 1998.

* cited by examiner

X-RAY OR NEUTRON MONOCHROMATOR

PRIORITY CLAIM

This application is a U.S. nationalization of PCT Application No. PCT/FR2006/000133, filed Jan. 20, 2006, and claims priority to French Patent Application No. 0500657, filed Jan. 21, 2005.

TECHNICAL FIELD

The invention concerns a monochromator device for selection of a band of wavelengths from incident radiation in a given range of wavelengths.

BACKGROUND

It is known to use X-rays or beams of neutrons to effect various analyses of materials.

A source of X-rays or neutrons is necessary for this, and a monochromator device is generally used. The purpose of the monochromator device is to select a wider or narrower band of wavelengths (i.e. energy) from the spectrum of the source whose extent in terms of wavelength is too large for the envisaged application.

For X-rays, the selection of a band of wavelengths is effected by means of the phenomenon of diffraction of X-rays by a perfect crystal.

Accordingly, incident X-rays whose spectrum extends over a given range of wavelengths received by a perfect crystal at a given angle of incidence give rise to diffraction of the radiation in a narrower band of wavelengths.

It will be noted that the width of the band of wavelengths diffracted by the crystal depends on the nature of the crystal used (lattice parameter, symmetry of the crystal) and on the crystallographic line chosen.

It is in particular known to use silicon as the perfect crystal, being a material well-known for the quality and the sufficient size of its crystals, for the ease with which it can be worked, and for its low cost.

However, the bandwidth of silicon proves to be too small compared to the bandwidth of the sources used and this leads to a considerable loss of flux. For example, for a source of X-rays used in the laboratory (for example employing a cathode ray tube or a rotary anode), from an emission line of a metal such as copper or molybdenum, the width of a fluorescence line is conventionally of the order of $\Delta E/E=3\text{-}5\times10^{-4}$, whereas the bandwidth of silicon 111 is $1.3\times10^{-4}$, which means that two thirds of the intensity of the incident radiation are lost. Silicon has too high a resolution for applications using the X-ray diffraction technique.

It is also known to use germanium as the perfect crystal, being a material available in the form of large perfect crystals and which, because of a higher electron density than silicon, and thus greater line widths, transmits three times the flux transmitted by a silicon crystal.

For example, the line width of 111 germanium ($\Delta\lambda/\lambda=3\times10^{-4}$) is well adapted to the case of a source formed of fluorescence lines the width of which is of the order of $3\text{-}5\times10^{-4}$ (see above).

However, the cost of a material such as germanium is higher than that of silicon and its mechanical characteristics (in particular its elastic limit) and its thermal characteristics (in particular its thermal conductivity) are worse than those of silicon. Because of this, with germanium as the crystal, it is difficult to envisage applications in which the curvature of the crystal must be variable and change as a function of the application. Such applications are encountered when it is required, for example, to focus X-rays at variable distances to adapt the optics to the apparatus or to focus different energies at a fixed distance.

The object of this focusing is to reduce the size of the beam produced at the location of the sample to be analyzed.

SUMMARY

The present invention aims to remedy at least one of the drawbacks referred to above by proposing a monochromator device for selection of at least one band of wavelengths from incident radiation in a given range of wavelengths, characterized in that it includes:

- at least one optical layer of a monocrystalline material whose crystallographic line is adapted to said at least one band of wavelengths to be selected, and
- a mechanical substrate, said at least one optical layer and the mechanical substrate being assembled by molecular bonding.

The monocrystalline character of the material of the optical layer ensures diffraction of the incident radiation, because of the arrangement of the crystal.

The invention therefore provides a monochromator device whose optical properties, vis-à-vis X-rays and beams of neutrons, are decoupled from the mechanical and/or thermal properties of the substrate.

To enable this decoupling, the optical layer must be sufficiently thin. It must nevertheless contain sufficient crystal planes to ensure diffraction. To this end its thickness is greater than the extinction length of the material, for example, which is a function of the crystallographic line of the chosen material.

Accordingly, the monochromator device of the invention is optically well adapted to the incident radiation thanks to the monocrystalline material diffracting optical layers). Thanks to the mechanical substrate, the device is easy to manipulate and can be used in applications where it is deformed and, for example, curved, with the mechanical substrate serving to impose bending of the diffracting layer.

Furthermore, by fastening a layer of monocrystalline material to the mechanical substrate by molecular bonding, there is no addition of any adhesive substance liable to degrade the optical properties of the monochromator device (focusing fluctuating in time and/or over the extent of the device), to insufficiently withstand the high flux of radiation present at the crystal and, because of this, to give rise to degraded properties, in particular thermal properties (thermal conductivity, etc.) and/or mechanical properties (mechanical strength, and the like).

Moreover, the optical layer of the monochromator device, which is made from a material that is generally more costly than the material constituting the mechanical substrate, constitutes only a portion of the device, which contributes to reducing the cost of the latter compared to a monochromator device consisting of a single monocrystalline material such as germanium, for example.

According to one feature, the mechanical substrate is produced from a material having better mechanical characteristics than the material constituting said at least one optical layer.

More particularly, said at least one material constituting the mechanical substrate has a higher mechanical resistance to bending than the monocrystalline material constituting said at least one optical layer.

According to one feature, said at least one optical layer has a thickness from 0.2 to 100 μm.

According to one feature, the monocrystalline material constituting said at least one optical layer is germanium.

According to one feature, the monocrystalline material constituting said at least one optical layer is chosen in particular from the following materials: AsGa, InSb, GaN, or InP.

According to one feature, the monocrystalline material constituting said at least one optical layer is chosen in particular from the following materials: silicon carbide, diamond, sapphire, lithium fluoride, quartz, BGO (bismuth germanium oxide), YAG (yttrium aluminum garnet), GGG (gadolinium gallium garnet), GSGG (gadolinium scandium gallium garnet), zirconium oxide, or strontium titanate.

According to one feature, the device includes at least two optical layers bonded one on top of the other and enabling selection of different bands of wavelengths, the monocrystalline material of one of the optical layers having a different crystal orientation than the monocrystalline material of the other optical layer. These two layers can consist of the same crystal material; in this case, these layers have different crystallographic orientations as a function of the bands of wavelengths to be selected.

The second optical layer can advantageously be the mechanical substrate, which is of a monocrystalline material in this case.

A complementary optical device can also be associated with the monochromator for choosing one of the two bands of wavelengths selected.

According to one feature, said at least one material constituting the mechanical substrate is silicon.

According to one feature, the mechanical substrate has a comb-like general shape and has, on its rear face, a series of grooves that are substantially parallel to each other and perpendicular to said at least one optical layer bonded to the front face of said substrate.

According to one feature, the radiation diffracted by said device is reflected by said at least one optical layer. Alternatively, the diffracted radiation can be transmitted by the monochromator: in this case the mechanical substrate is adapted to enable such transmission, either because it is transparent to the band of wavelengths selected or as a result of producing opening(s) in said substrate.

The invention also consists of a method of fabricating a monochromator device for selecting at least one band of wavelengths from incident radiation in a given range of wavelengths, characterized in that it includes a step of assembly by molecular bonding of a mechanical substrate with at least one optical layer of a monocrystalline material having a crystallographic line adapted to said at least one band of wavelengths to be selected.

According to one feature, the mechanical substrate is made from at least one material having better mechanical characteristics than the material constituting said at least one optical layer.

According to one feature, the method includes a heat treatment step for consolidating the molecular bonding forces between the respective two surfaces of the optical layer and the substrate bonded to each other.

The temperature of this heat treatment must in particular be a function of the difference between the coefficients of thermal expansion of the two materials (that of the optical layer and that of the mechanical substrate), in order to guarantee the integrity of the monochromator during this step.

According to another feature, the method includes a step of thinning said at least one optical layer.

BRIEF DESCRIPTION OF THE DRAWINGS

Other features and advantages will become apparent in the course of the following description, given by way of nonlimiting example only and with reference to the appended drawings, in which.

DETAILED DESCRIPTION

Figure 1:
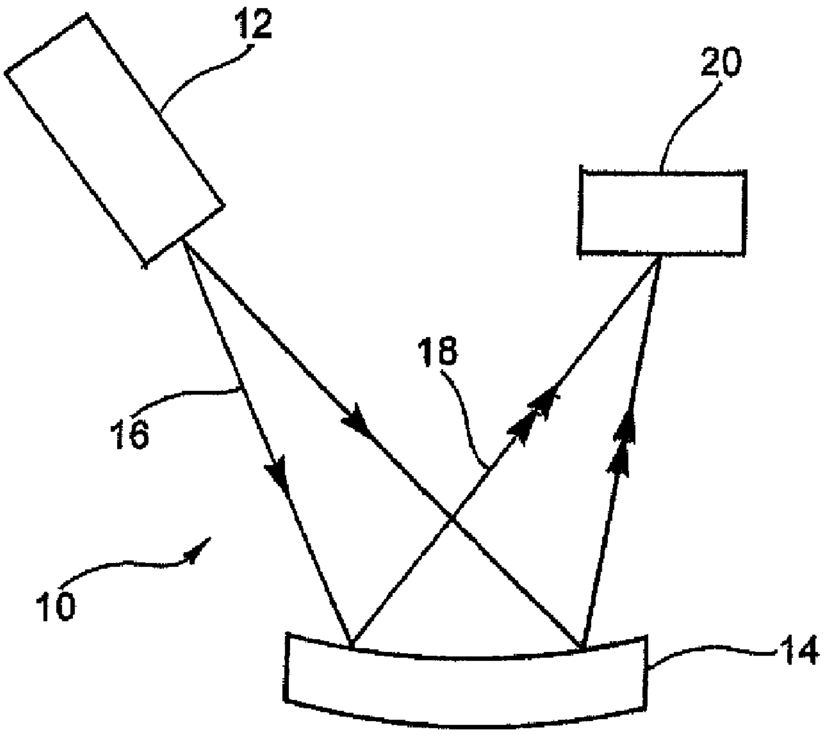
FIG. 1 illustrates one example of the situation of a monochromator device of the invention.

As shown in FIG. 1, an optical system 10 comprises a source 12 of X-rays, for example an X-ray tube based on the emission line of copper and for which the width $\Delta E/E$ of a fluorescence line is of the order of $3\times10^{-4}$. This source can equally be a synchrotron source that emits X-rays with a continuous energy spectrum from 5 to 50 keV, for example.

The system 10 also includes a monochromator device 14 that is adapted to select at least one band of wavelengths, as a function of the crystallographic line of the material constituting the optical layer and the angle of incidence of the incident radiation 16. The device 14 thus reflects a diffracted beam 18 in a band of wavelengths of width $\Delta E/E$, for example, equal to $10^{-4}$ in the direction of an object 20 (sample) to be analyzed. Alternatively, the device 14 can transmit the diffracted beam.

It will be noted that the selected band can be narrower or wider within the bandwidth of the source.

As shown in FIG. 1, the curvature of the monochromator device 14 focuses the incident X-rays 16 emitted by the source 12 onto the sample 20 in accordance with the standard laws of optics.

If the angle of incidence is modified to select a different band of wavelengths, it can be beneficial to modify the curvature of the monochromator in order to be able to focus the radiation at the same distance as when using the previous band of wavelengths.

Figure 2:
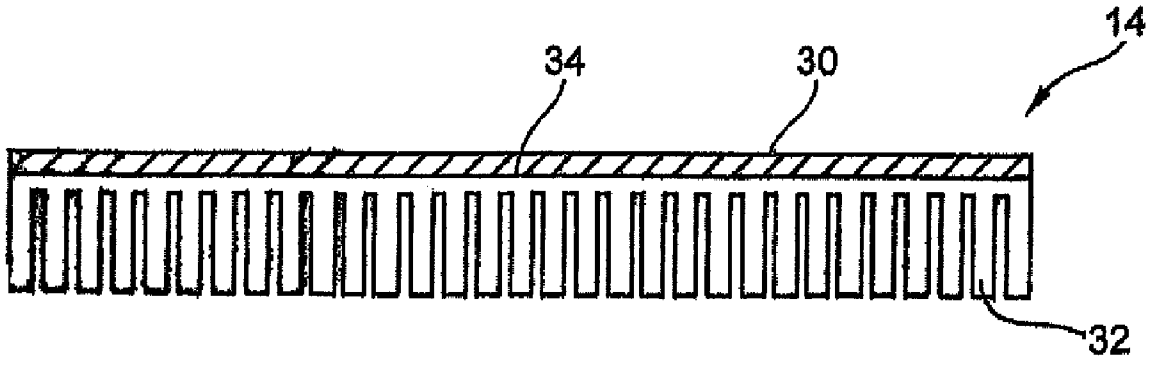
FIG. 2 illustrates schematically the monochromator device from FIG. 1.

The monochromator device 14 is represented diagrammatically in FIG. 2 in an uncurved position, for example.

This device comprises an optical layer 30 produced in a monocrystalline material adapted to diffract X-rays, and this material is chosen so that its lattice parameter, its crystal symmetry and its crystallographic line are suited to the band of X-ray wavelengths to be selected.

This optical layer is made in monocrystalline germanium, for example, more particularly 111 germanium.

It will be noted that the crystal material constituting the optical layer can be replaced by one of the following materials: AsGa, InSb, InP, or GaN to obtain specific bands of wavelengths.

If it is required to improve the energy resolution of the monochromator device, then the monocrystalline material used for the optical layer can be of lower electron density than germanium and the following may be used instead, for example: silicon carbide, diamond, sapphire, lithium fluoride, quartz, BGO, YAG, GGG, GSGG, zirconium oxide, or strontium titanate.

The optical layer has a thickness that is generally from 0.2 to 100 μm, for example equal to 10 μm.

The thickness of monocrystalline material that is necessary to diffract X-rays is low (of the order of a few crystal planes), which explains the small thickness of the optical layer, which can therefore be considered a thin layer. This is also advantageous in that it reduces the cost of the monocrystalline material used for the optical layer.

The monochromator device 14 from FIG. 2 also includes a mechanical substrate 32 that is assembled to the optical layer 30 by molecular bonding at the interface 34 between the two components of the assembly.

Thanks to this assembly technique, no adhesive substance is necessary for bonding the optical layer and the mechanical substrate.

This is therefore particularly beneficial for the envisaged applications of the monochromator device in that the latter is liable to be subjected to intense radiation, with the risk of degrading the mechanical and thermal properties of an adhesive substance. Such radiation could also have repercussions in terms of the performance of the monochromator device. Moreover, the addition of glue could lead to fluctuations of thickness, for example, and thus of optical behavior over the extent of the monochromator and/or over time.

The mechanical substrate 32 is advantageously made from at least one material that has better mechanical characteristics than the monocrystalline material constituting the optical layer 30 and that is compatible with molecular bonding either directly or via an intermediate layer.

In particular, for the envisaged application shown in FIG. 1, it is desirable for the materials) constituting the mechanical substrate to have a higher resistance to bending than the material constituting the optical layer 30, in order for it to be possible for the structure obtained (FIG. 2) to be bent repeatedly without damaging the monochromator device.

Silicon is used as the material constituting the substrate 32, for example, the cost thereof is much lower than that of the diffracting material used for the optical layer 30.

It is therefore seen that the greater portion of the structure of the monochromator device 14 is made from a material of relatively low cost, so that the fabrication of the structure as a whole has a lower cost than that of a structure consisting only of a material such as germanium.

For it to be possible for the monochromator device 14 to be curved for applications like that represented in FIG. 1, and in particular to be subjected to cycles of bending and returning to the flat state in ranges of radii of curvature from 1 m to infinity, without fatigue or deterioration of properties, the substrate 32 has an appropriate comb-like general shape, for example.

Thus on the rear face of the substrate 32 there is found a series of grooves that are substantially parallel to each other and perpendicular to the front face of the substrate bonded to the optical layer 30.

A structure of this kind is therefore particularly well adapted to adopting a variable curvature because of the great flexibility conferred by the grooves in a direction perpendicular thereto.

Furthermore, the structure is of great rigidity in a direction parallel to the grooves, which defines perfectly the angle of incidence of the incident beam and therefore the band of wavelengths selected.

The mechanical substrate has a thickness of the order of one centimeter, for example, to facilitate manipulation of the optical layer and the monochromator in general. The thickness may nevertheless be close to several centimeters depending on the applications envisaged.

The monochromator device of the invention can also find beneficial applications when it is necessary to obtain, with an optical system, a plurality of bands of wavelengths from the same incident beam of X-rays.

Figure 3:
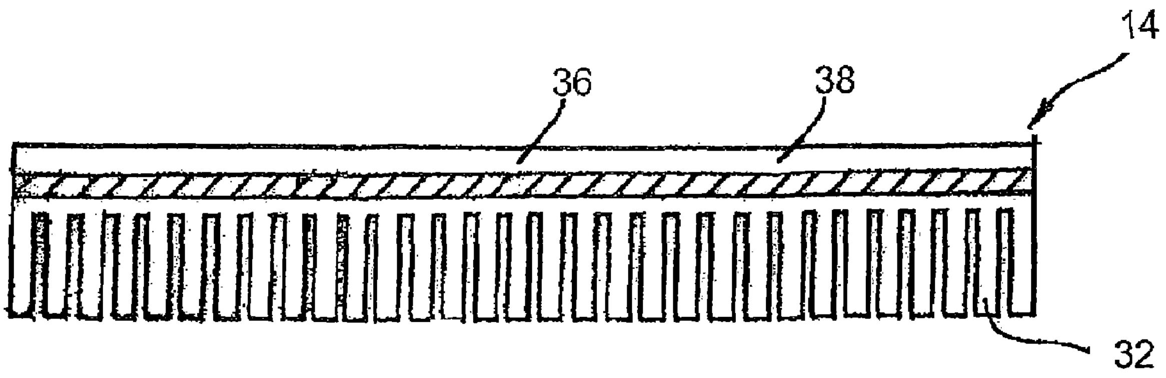
FIG. 3 illustrates a monochromator device in accordance with an embodiment having at least two optical layers.

For example, as illustrated in FIG. 3, when illuminating an optical system comprising a monochromator device including at least two suitable optical layers 36 and 38 (one of the optical layers can be the substrate if the latter is suitable, and in particular if it is of monocrystalline material) with "white" synchrotron radiation (which contains all energies from 5 to 50 keV, for example), the two optical layers will each reflect a different band of wavelengths. An optical device can then be added to the monochromator if it is wished to be able to select at will one or the other of the accessible bands.

It is possible to adjust these two bands of wavelengths on either side of an absorption threshold with a very simple optical system, for example.

The structure of the monochromator device 14 used in this application can be produced by assembling a germanium optical layer onto a silicon mechanical substrate, for example, these two materials having different crystal orientations and respective crystal parameters of 5.43 Å and 5.65 Å.

With the simplified optical system referred to above, it is therefore possible to obtain differential contrast measurements, for example to perform iodine threshold angiography. The principle of this analysis is to observe human body tissue regions (for example, arteries) in which iodine is circulating. Using radiation having two bands of wavelengths arranged on either side of the iodine absorption threshold, through differential processing of the results it is possible to ignore radiation emanating from tissue not containing iodine in order to locate regions containing iodine.

The structure with two superposed optical layers enables the monochromator device to be adapted to the required resolution in that the lines of the monocrystalline material whose index is high give narrower reflections than the lines of the material whose index is lower.

It should be noted that superposing more than two optical layers can be envisaged if necessary, depending on the envisaged application.

One embodiment of the method of fabricating the monochromator device represented in FIG. 2 will now be described.

The fabrication method provides for the use of a mechanical, for example silicon, substrate of parallelepiped shape, for example, which has a length of 120 mm, a height of 12 mm and a length of 80 mm, for example (the width is the dimension perpendicular to the plane of FIG. 2).

As represented in FIG. 2, the substrate has on its rear face a plurality of grooves, for example, spaced at a pitch of 1.5 mm, having a width of 1 mm and a depth of 11.3 mm.

An arrangement of this kind confers particularly beneficial bending properties on the substrate, in particular sufficient rigidity in the direction of the grooves and great flexibility in the direction perpendicular to them.

It will be noted that other substrates with different arrangements of the pitch, width and depth of the grooves can also confer satisfactory bending properties.

Moreover, it should be noted that other arrangements confer satisfactory bending properties on a mechanical substrate, enabling it subsequently to be bent repetitively, for example in applications requiring focusing of X-rays at variable distances.

The optical layer 30 of monocrystalline material diffracting the X-rays can be produced from a monocrystalline germanium substrate.

For example, a 500 Å thick oxide layer is deposited on the face of the germanium substrate that is to be fastened to the front face of the mechanical substrate 32 in order to facilitate subsequent molecular bonding.

This oxide layer is formed by a plasma enhanced chemical vapor deposition (PECVD), for example.

The front face of the mechanical substrate can also be coated with a layer of oxide if required.

The faces of the silicon and germanium substrates intended to be fastened to each other at the interface 34 from FIG. 2 are then prepared by wet or dry chemical treatments known in the art to obtain a surface state compatible with direct molecular adhesion between the faces of the two substrates, in particular in terms of surface roughness and hydrophilia or hydrophobia.

It will be noted that the treatments applied to the substrate can be of the mechanical-chemical type.

The substrates to be assembled are then brought into contact with a view to molecular bonding.

The fabrication method includes a heat treatment step for consolidating the bonding forces between the two faces in contact of the respective two substrates as soon as the molecular bonding is effected.

This heat treatment consists, for example, in heating the two substrates to a temperature from 150 to 250° C. which is suitable for the difference between the coefficients of thermal expansion of silicon and germanium.

The fabrication method also provides a subsequent step of thinning the germanium substrate to obtain a thin optical layer, for example with a thickness equal to 10 μm.

The thinning step can be carried out mechanically, for example, by grinding, or by chemical means, using wet or dry etching methods, or mechano-chemically.

Once the thinning has been obtained, the optical layer 30 can be polished mechano-chemically to obtain a layer of low work hardening and low surface roughness as represented in FIG. 2.

The fabrication method described above therefore yields the FIG. 2 monochromator device structure, in which:

1) the support 32, for example of silicon, is relatively inexpensive and has mechanical properties compatible with repeated bending, and 2) the upper layer 30, for example of germanium, constitutes a film adapted to diffract the X-rays and that is particularly adapted to the incident radiation, enabling efficacious use of the intensity of the X-ray source used.

The resolving power of this kind of monochromator device 14, which is measured by the ratio $\lambda/\Delta\lambda$ of the wavelength to the smallest wavelength difference that the device can distinguish, is $\frac{1}{3}\times10^{-4}$=3,300 (for a germanium on silicon optical layer).

It will be noted that the monochromator device can be used for X-ray fluorescence.

The device can equally be used in a Seeman-Bohlin reflection chamber.

The monochromator device 14 that has just been described can furthermore be used with a beam of neutrons.

Neutron beams are generally obtained by means of a nuclear reactor and generally have an energy from 1 to 500 MeV.

For most elements, the absorption of neutrons is very small compared to that of X-rays, so that large samples can be processed using beams of neutrons.

With neutrons, it is possible to obtain a contrast between atoms different from that of X-rays, which can be beneficial if it is required to study structures formed of elements with similar atomic numbers.

It will be noted that a monochromatic beam of X-rays or neutrons obtained with a monochromatic device of the invention can be used, for example:

1) to determine crystal parameters of a material, 2) to identify crystal phases in a material, 3) to determine crystal structures in a material.

The invention claimed is:

1. A monochromator device adapted to select at least one band of wavelengths from incident radiation in a given range of wavelengths, the monochromator device comprising:

at least one optical layer of a monocrystalline material, wherein a crystallographic line of the monocrystalline material is adapted to the at least one band of wavelengths, wherein a thickness of the at least one optical layer is greater than an extinction length of the monocrystalline material, but sufficiently thin to enable the curvature to be changed while continuing to focus the incident radiation at a focal point, and a mechanical substrate, wherein the at least one optical layer and the mechanical substrate are assembled by molecular bonding.

2. The monochromator device according to claim 1, wherein the mechanical substrate comprises a material having mechanical characteristics superior to the mechanical characteristics of the monocrystalline material constituting the at least one optical layer.

3. The monochromator device according to claim 1, wherein the mechanical substrate comprises a material having a higher mechanical resistance to bending than the monocrystalline material of the at least one optical layer.

4. The monochromator device according to claim 1, wherein the at least one optical layer has a thickness of approximately 0.2 to 100 μm.

5. The monochromator device according to claim 1, wherein the monocrystalline material of the at least one optical layer comprises germanium.

6. The monochromator device according to claim 1, wherein the monocrystalline material of the at least one optical layer comprises one of AsGa, InSb, GaN, or InP.

7. The monochromator device according to claim 1, wherein the monocrystalline material of the at least one optical layer comprises one of silicon carbide, diamond, sapphire, lithium fluoride, quartz, bismuth germanium oxide, yttrium aluminum garnet, gadolinium gallium garnet, gadolinium scandium gallium garnet, zirconium oxide, or strontium titanate.

8. The monochromator device according to claim 1, further comprising at least two optical layers bonded on top of each other and adapted to enable selection of different bands of wavelengths, wherein the crystal orientation of one of the at least two optical layers is different than the crystal orientation of the other of the at least two optical layers.

9. The monochromator device according to claim 1, wherein the mechanical substrate comprises silicon.

10. The monochromator device according to claim 1, wherein the radiation diffracted by the monochromator device is reflected by the at least one optical layer.

11. The monochromator device according to claim 1, wherein the radiation diffracted by the monochromator device is transmitted by the at least one optical layer.

12. A method of fabricating a monochromator device configured to select at least one band of wavelengths from incident radiation in a given range of wavelengths, the method comprising assembling a mechanical substrate with at least one optical layer of a monocrystalline material by molecular bonding, the monocrystalline material having a crystallographic line adapted to the at least one band of wavelengths, wherein a thickness of the at least one optical layer is greater than an extinction length of the monocrystalline material but sufficiently thin to enable the curvature to be changed while continuing to focus the incident radiation at a focal point.

13. The method according to claim 12, wherein the mechanical substrate comprises at least one material having mechanical characteristics superior to the mechanical characteristics of the monocrystalline material of the at least one optical layer.

14. The method according to claim 12, further comprising heating the mechanical substrate to consolidate the molecular bonding forces between the respective surfaces of the optical layer and the mechanical substrate.

15. The method according to claim 12, further comprising thinning the at least one optical layer.

16. The monochromator device according to claim 1, wherein the incident radiation comprises X-rays and the given range of wavelengths have a width ΔE/E, and wherein the at least one band has a width substantially similar to the width ΔE/E of the incident radiation.

17. The monochromator device according to claim 1, wherein the mechanical substrate and the at least one optical layer comprises curved surfaces.

18. The monochromator device according to claim 1, wherein the at least one optical layer and the mechanical substrate are assembled by molecular bonding in the absence of an adhesive substance.

19. The method according to claim 12, wherein the incident radiation comprises X-rays and the given range of wavelengths have a width ΔE/E, and wherein the at least one band has a width substantially similar to the width ΔE/E of the incident radiation.

20. A monochromator device, adapted to select at least one band of wavelengths from incident radiation in a given range of wavelengths, the monochromator device comprising:

at least one optical layer of a monocrystalline material, wherein a crystallographic line of the monocrystalline material is adapted to the at least one band of wavelengths, and a mechanical substrate, wherein the at least one optical layer and the mechanical substrate are assembled by molecular bonding and wherein the mechanical substrate comprises a comb-like shape with a series of grooves on its rear face that are substantially parallel to each other and perpendicular to the at least one optical layer bonded to the front face of the mechanical substrate.

* * * * *

UNITED STATES PATENT AND TRADEMARK OFFICE

CERTIFICATE OF CORRECTION

PATENT NO. : 7,702,072 B2
APPLICATION NO. : 11/814330
DATED : April 20, 2010
INVENTOR(S) : Francois Rieutord It is certified that error appears in the above-identified patent and that said Letters Patent is hereby corrected as shown below:

<u>On the Title Page</u>

Item (73), replace "a l'Energie" with --a L'Energie--.

Signed and Sealed this

Twentieth Day of July, 2010

David J. Kappos
*Director of the United States Patent and Trademark Office*